US012594532B2

(12) United States Patent
Oren et al.

(10) Patent No.: US 12,594,532 B2
(45) Date of Patent: Apr. 7, 2026

(54) FOAM PITCHER

(71) Applicant: Starbucks Corporation, Seattle, WA (US)

(72) Inventors: Nathan C. Oren, Edgewood, WA (US); Joseph E. Gormley, Mercer Island, WA (US)

(73) Assignee: Starbucks Corporation, Seattle, WA (US)

( * ) Notice: Subject to any disclaimer, the term of this patent is extended or adjusted under 35 U.S.C. 154(b) by 886 days.

(21) Appl. No.: 17/813,863

(22) Filed: Jul. 20, 2022

(65) Prior Publication Data

US 2023/0234010 A1 Jul. 27, 2023

Related U.S. Application Data

(60) Provisional application No. 63/302,475, filed on Jan. 24, 2022.

(51) Int. Cl.
*B01F 35/75* (2022.01)
*B01F 35/10* (2022.01)
(Continued)

(52) U.S. Cl.
CPC .......... *B01F 35/7548* (2022.01); *B01F 35/11* (2022.01); *B01F 35/1452* (2022.01);
(Continued)

(58) Field of Classification Search
CPC .. B01F 35/1452; B01F 35/1453; B01F 35/11; B01F 35/7548
(Continued)

(56) References Cited

U.S. PATENT DOCUMENTS 547,927 A * 10/1895 Koch ...................... A47L 15/23 134/152
2,587,344 A 2/1952 Livingstone
(Continued)

FOREIGN PATENT DOCUMENTS

EP 1475024 8/2005
KR 10-2075001 B1 2/2020
(Continued)

OTHER PUBLICATIONS

International Preliminary Report on Patentability and Written Opinion issued in the corresponding International Patent Application No. PCT/US2023/010794, dated Jul. 30, 2024, 5 pages.
(Continued)

*Primary Examiner* — David L Sorkin
(74) *Attorney, Agent, or Firm* — Knobbe, Martens, Olson & Bear, LLP

(57) ABSTRACT

An apparatus for preparing foam or blended media can include a pitcher with a blending mechanism and a blending motor. The blending motor can be configured to actuate the blending mechanism. The pitcher can be configured to receive ingredients therein and the blending mechanism can be configured to blend the ingredients to produce the foam or the blended media. The apparatus can include a base with a rinsing feature configured to spray a liquid into an interior of the pitcher. The apparatus can include one or more pivot arms coupled to the pitcher and the base. The one or more pivot arms can be configured to actuate rotation of the pitcher.

17 Claims, 6 Drawing Sheets

(51) Int. Cl.

| | |
|---|---|
| ***B01F 35/11*** | (2022.01) |
| ***B01F 35/43*** | (2022.01) |
| ***B01F 101/14*** | (2022.01) |
| *B01F 101/16* | (2022.01) |

(52) U.S. Cl.
CPC .......... *B01F 35/1453* (2022.01); *B01F 35/43* (2022.01); *B01F 2101/14* (2022.01); *B01F 2101/16* (2022.01)

(58) Field of Classification Search
USPC .................................. 366/138; 134/152, 153
See application file for complete search history.

(56) References Cited

U.S. PATENT DOCUMENTS

| | | | | |
|---|---|---|---|---|
| 10,215,490 | B1 | 2/2019 | Valentin | |
| 2002/0090439 | A1 | 7/2002 | Lichi | |
| 2003/0164413 | A1* | 9/2003 | Schaefer | A47L 15/0065 134/171 |
| 2004/0160857 | A1 | 8/2004 | Haughton et al. | |
| 2004/0168711 | A1* | 9/2004 | Dickson, Jr. | B08B 9/0826 134/146 |
| 2005/0178805 | A1 | 8/2005 | Abrahams | |
| 2008/0291777 | A1 | 11/2008 | Schnipke et al. | |
| 2009/0007801 | A1 | 1/2009 | Giner Pena | |
| 2010/0237517 | A1 | 9/2010 | Stahl et al. | |
| 2011/0057062 | A1 | 3/2011 | Schleinzer | |
| 2016/0000244 | A1 | 1/2016 | Fedewa | |
| 2017/0079464 | A1 | 3/2017 | Apone et al. | |
| 2023/0255407 | A1 | 8/2023 | Oren et al. | |

FOREIGN PATENT DOCUMENTS

| | | | |
|---|---|---|---|
| KR | 2021-0128763 | | 10/2021 |
| KR | 2021 0128763 | A | 10/2021 |
| WO | WO 2017/086901 | A1 | 5/2017 |
| WO | WO 2019/123229 | A1 | 6/2019 |
| WO | WO 2023/141063 | A1 | 7/2023 |
| WO | WO 2023/158558 | A1 | 8/2023 |

OTHER PUBLICATIONS

International Search Report and Written Opinion issued in the coresponding International Patent Application No. PCT/US2023/010794, dated May 2, 2023 in 12 pages.

* cited by examiner

FOAM PITCHER

CROSS-REFERENCE TO RELATED APPLICATION(S)

This application claims the benefit of U.S. Provisional Application No. 63/302,475, filed Jan. 24, 2022, which is hereby incorporated by reference in its entirety.

FIELD

The present disclosure relates to systems and methods for dispensing a foam or blended media, such as, systems and methods for dispensing foam from a container or pitcher.

BACKGROUND

Certain beverages are prepared with foams that need to be frequently dispensed and/or kept at temperatures lower than room temperature. Certain beverages are prepared with cold foam or blended media, which can be made with dairy or non-dairy are expanded with air. In some examples, the cold foam can be made with milk or other liquids. The cold foam or blended media can be used to finish or top a beverage. Adding a cold foam or blended media can provide a flavor, texture, or visual interest that enhances the beverage. The cold foam or blended media can be customized by adding flavors and powders to change the color, taste or texture.

However, the typical process of cold foaming or blending/aerating dairy or non-diary can be time consuming and complex. The typical process can include mixing liquid dairy or non-dairy base with sweetener, flavor, syrups, or powders. The typical process can also include blending or aerating in an apparatus, such as a blender, or by hand. The production process can take more than 15 seconds to complete, which can slow down beverage production. The process can also include removing the pitcher from the system to pour the finished product to create the desired beverage.

Additionally, the foam or blended media may need to be dispensed soon after creation in order to maintain product integrity and prevent spoilage. This can create operation inefficiencies for baristas by requiring dispensing at smaller batches and dispensing foam or blended media soon after creating the finished product. Furthermore, the production of finished product can require extensive cleaning, which can be time consuming, particularly if cold foam or blended media is produced as a single batch.

SUMMARY

The systems, methods and devices of this disclosure each have several innovative aspects, no single one of which is solely responsible for the desirable attributes disclosed herein.

An aspect of certain embodiments is an apparatus for preparing foam or blended media that comprises a pitcher comprising a blending mechanism and a blending motor. The blending motor is configured to actuate the blending mechanism. The pitcher is configured to receive ingredients therein and the blending mechanism is configured to blend the ingredients to produce the foam or the blended media. The apparatus can include a base comprising a rinsing feature configured to spray a liquid into an interior of the pitcher and one or more pivot arms coupled to the pitcher and the base. The one or more pivot arms are configured to actuate rotation of the pitcher.

The apparatus can further include one or more of the following features alone or in combination. The base can comprise a base motor configured to power the one or more pivot arms to actuate rotation of the pitcher. The pitcher can be configured to rotate into a blending position, wherein in the blending position the pitcher is oriented substantially vertically with an open end of the pitcher positioned above a closed end of the pitcher. The closed end of the pitcher can be engaged with the base in the blending position. The pitcher can be configured to rotate into a pouring position, wherein in the pouring position the pitcher is rotated between about 20° to about 120° from a vertical axis. The pitcher can be configured to rotate into a cleaning position, wherein in the cleaning position the pitcher is oriented substantially vertically with a closed end of the pitcher positioned above an open end of the pitcher. The rinsing feature can include a shower head that is configured to spray the liquid towards an interior of the pitcher when the pitcher is in the cleaning position. The rinsing feature can include a shower head configured to pop up towards the pitcher. The rinsing feature can include a high pressure inset spray head. The pitcher can be rotated by each of the one or more pivot arms at a rotation point, wherein the rotation point is a point where each of the one or more pivot arms attaches to the pitcher. The one or more pivot arms can comprise two pivot arms, each of the two pivot arms attached to opposing sides of the pitcher. The base can further comprise a water inlet The base can further include a drain. The base can further comprise gradient markers on a top surface of the base. The base can further comprise one or more activation buttons to activate a blending mode or a cleaning mode. The base can include one or more activation buttons to activate rotation of the pitcher. The liquid can comprise water or a cleaning solution. The blending mechanism can include one or more blades The blending mechanism can comprise a whisk. The apparatus can include a ring to fit around a circumference of the pitcher, wherein each of the one or more pivot arms are fastened to the ring to couple each of the one or more pivot arms to the pitcher.

Another aspect of certain embodiments disclosed herein is a method for preparing foam or blended media wherein the method comprises positioning one or more ingredients in a pitcher positioned in a blending position; blending the one or more ingredients positioned in the pitcher to produce the foam or the blended media; rotating the pitcher into a pouring position to pour the foam or the blended media from the pitcher into a container; rotating the pitcher into a cleaning position; and initiating a spray of liquid towards an interior of the pitcher.

The method can further include one or more of the following features alone or in combination. In the blending position, the pitcher can be oriented substantially vertically with an open end of the pitcher positioned above a closed end of the pitcher. In the pouring position, the pitcher is rotated between about 20° to about 120° from a vertical axis. In the cleaning position, the pitcher is oriented substantially vertically with a closed end of the pitcher positioned above an open end of the pitcher.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure. Portions of the blending pitcher system are shown transparent to show the internal blending mechanism.

DETAILED DESCRIPTION

Figure 1:
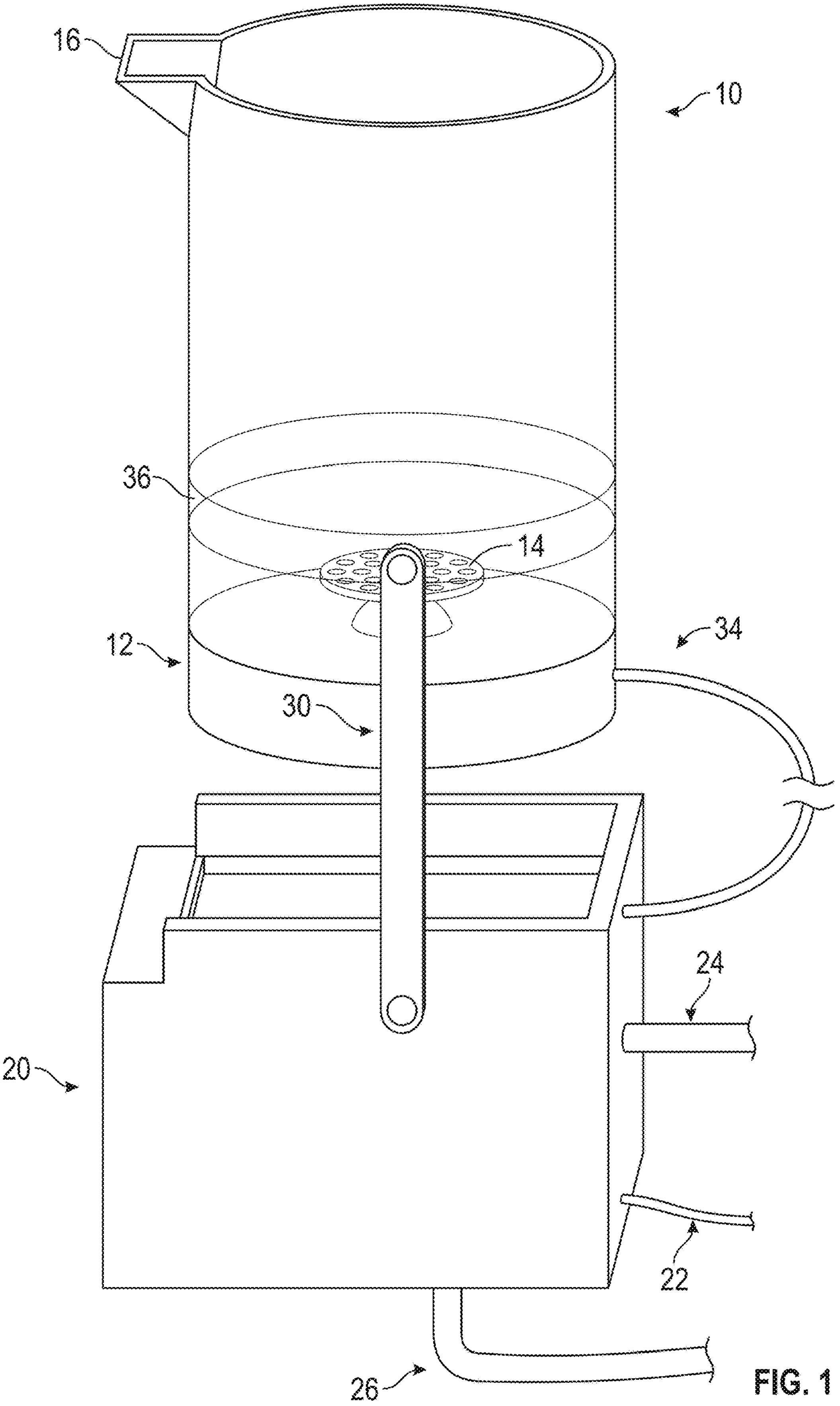
FIG. 1 illustrates a side view of a blending pitcher system in a blending position.

Various extraction systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein. For example, many of the embodiments are described in the context of preparing foam or blended media from liquid bases at room temperature or at temperatures colder than room temperature. However, certain features and aspects of the disclosure may also have utility in producing foams or blended media at temperatures above room temperature or from liquid bases at above room temperature.

Many of the embodiments described herein involve foaming or blending liquid, such as milk or a non-dairy liquid. For instance, in some embodiments, the liquid to be foamed or blended may be referred to herein as the "liquid base" or may be a dairy or non-dairy liquid, such as milk, cream, almond milk, soy milk, oat milk, coconut milk, cashew milk, other alternative milks, other plant-based liquids, coffee, tea, or hemp extract. In some examples, the liquid base can be a premanufactured mixture or a production of fresh ingredients. The liquid base can be modified using food grade modifiers including and not limited to gums, emulsifiers and thickeners. The composition of the liquid base may be fine-tuned with the modifiers to provide the desired texture and taste of the finished product. The finished product may also include syrup, powder, sweetener, flavor, or other inclusions.

For example, many of the embodiments are described in the context of creating and dispensing a foam or blended media from a container at room temperature or at temperatures colder than room temperature, which may be considered cold foams or blended media. However, certain features and aspects of the disclosure may also have utility in creating and dispensing foam or blended media at temperatures above room temperature or from liquid bases at above room temperature.

To produce edible finished products safe for human consumption, the foam finished products should be produced under sanitary conditions and need to be maintained at safe temperatures to prevent the growth of pathogens and prevent spoilage. The term "cold foam" as used herein is applied broadly to refer to foams or blended media prepared with the use of base or liquid base not exceeding 100° F. For instance, in certain configurations described herein, the liquid base may be maintained between 0° F. and 100° F. In certain embodiments, the temperature of the liquid base may be maintained between 30° F. and 50° F. and in certain embodiments between 30° F. and 40° F. and in certain embodiments between 60° F. and 70° F. In certain embodiments, the cold foam produced may have a temperature not exceeding 45° F. Certain aspects of the dispensing foam embodiments disclosed below are particularly advantageous to producing such "cold foams" and are often described in the context of producing a cold foam. However, it should be appreciated, that the certain aspects and features embodiments disclosed herein are not limited to embodiments that produce cold foams but also can find utility in producing hot or warm foams such as cold foams that are blended with warm or hot foams.

FIG. 1 illustrates an embodiment of a foam pitcher system. The system can include a base 20 and a pitcher or container 10. The pitcher 10 can include an open end or portion and a closed end or portion. The open end of the pitcher 10 can include a spout 16 configured to funnel and dispense foam from an interior of the pitcher 10. The pitcher 10 at the closed end can include a blending mechanism 14, such as one or more blades or a whisk. The pitcher 10 at the closed end can also include a blending motor 12 to actuate (e.g., rotate) the blending mechanism 14. The pitcher 10 can receive one or more ingredients, such as a liquid base and a syrup. In certain embodiments, the one or more ingredients may be added to the open end of the pitcher manually or through an automated or semi-automated dispensing system. The motor 12 can then actuate the blending mechanism 14, such as by rotating the blending mechanism 14 at a rate between about 2500 and about 30000 revolutions (or between 2500 and 30000) per minute, to blend ingredients placed in the pitcher 10. The actuation of the blending mechanism 14 in the one or more ingredients can blend the ingredients and expand the ingredients with air to create a foam or blended media.

Figure 4:
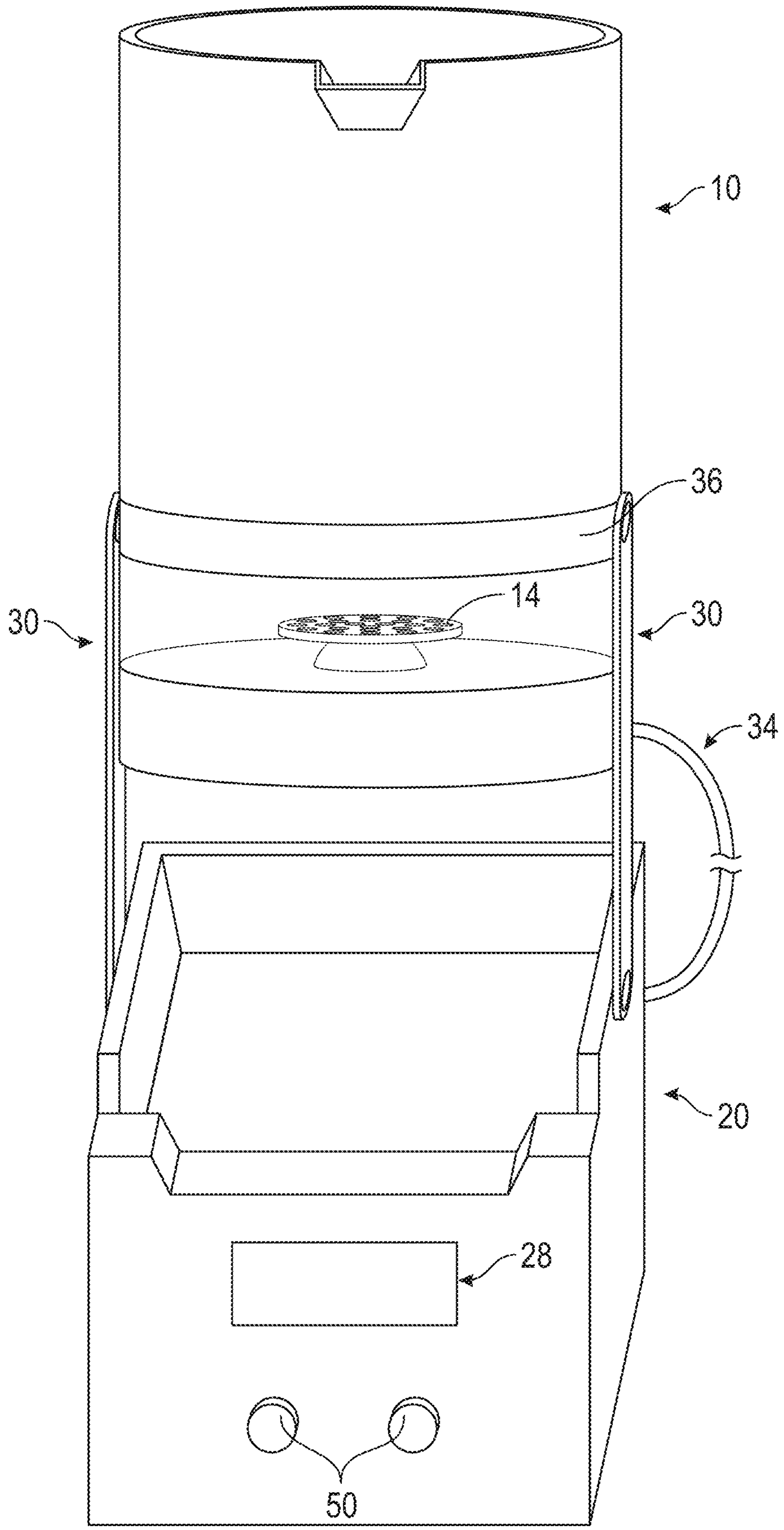
FIG. 4 illustrates a front view of the blending pitcher system.

The system can further include one or more pivot arms 30 that connects or couples the base 20 and the foam pitcher 10. In some examples, the one or more pivot arms 30 are permanently fixed to the foam pitcher 10 and/or the base 20. In some examples, the one or more pivot arms 30 can be removably attached to the foam pitcher 10 and/or the base 20. For each of the pivot arms 30, a first end of the pivot arm 30 is coupled to the base 20 and a second end of the pivot arm 30 is coupled to the foam pitcher 10. In some examples, the system includes two pivot arms 30, such as shown in FIG. 4, each positioned on or attached to opposing sides of the pitcher 10. The two pivot arms 30 can be positioned on opposing sides of the foam pitcher 10 and/or the base 20, such as on either side of the spout 16. As shown, the system can include a ring 36 fit and around the circumference of the foam pitcher 10 and hold the foam pitcher 10. The one or more pivot arms 30 can be fastened or otherwise attached to the ring 26 to couple the pivot arm 30 to the pitcher 30. In other embodiments, the system can include a clamp instead of the ring 26 to attach the pivot arms 30 to the pitcher 30. In other embodiments, the pivot arms 30 can be directly attached to the pitcher 30. The one or more pivot arms 30 allows the foam pitcher 10 to rotate or tilt into various positions. In some examples, the one or more pivot arms 30 can be configured to rotate the pitcher 10 up to 360°. In some examples, the one or more pivot arms 30 can be configured to rotate the pitcher 10 up to 180°. The one or more pivot arms 30 can be powered by a motor, such as a base motor in the base 20, to actuate rotation of the pitcher 10. The pitcher 10, including the motor 12 and blades 14, can be rotated or tilted into various positions. For example, as shown in FIG. 1, the pitcher 10 can be in a blending position. In the blending position, the pitcher 10 can be upright such that the pitcher is oriented substantially vertically, such that the length of the pitcher 10 is substantially aligned with a vertical axis (such as between about 10° to about 15° from the vertical axis or between 10° to 15° from the vertical axis), and the open end of the pitcher 10 is positioned above the closed end. In this blending or upright position, the closed end of the pitcher 10 can be engaged with the base 20.

The base 20 can include a water inlet 24, a drain 26, and a power cable 22. The base 20 can also include a communication cable 34 between the base 20 and the foam pitcher 10. The communication cable 34 can allow communication between the base 20 and the blending motor 12. The base 20 can also include a base motor to actuate movement of the pitcher 10, such as rotation of the pitcher 10. The base motor in the base 20 can actuate rotation of the pitcher 10. For each pivot arm 30, the pitcher 10 can be rotated at a rotation point 32, which can be a point where each of the pivot arms 30 attaches to the pitcher 10.

Figure 2:
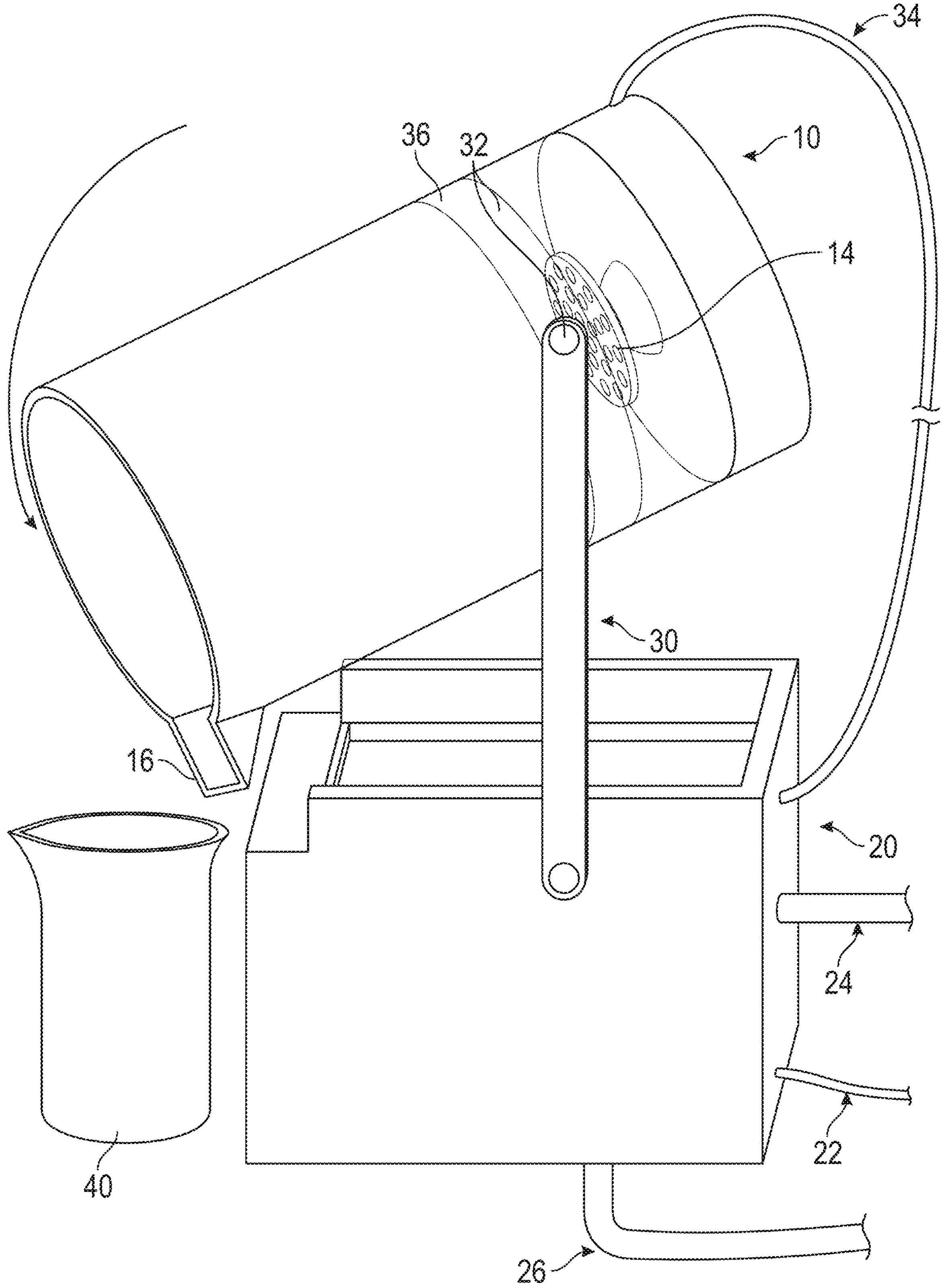
FIG. 2 illustrates a side view of the blending pitcher system in a dispensing position.

As shown in FIG. 2, the pitcher 10 is shown in a pouring or dispensing position, such that the pitcher 10 has been rotated to dispense foam from the interior of the pitcher 10 into a cup 40. In some examples, the pitcher 10 can be rotated between about 20° to about 120° (or between 20° to about 120°) from a vertical axis or from the blending position to achieve the pouring position. In certain embodiments, the pouring position may be between about 40° to about 100° and in certain embodiments between about 100° to about 105°; and in certain embodiments the pouring position may be between 40° to 100° and in certain embodiments between 100° to 105°. In the embodiments disclosed herein it is anticipated that the pitcher 10 can be rotated manually or through the use of motorized mechanisms which can be, in certain embodiments, automated such that the activation of a switch or button can cause the pitcher to be automatically rotated between positions.

Figure 3:
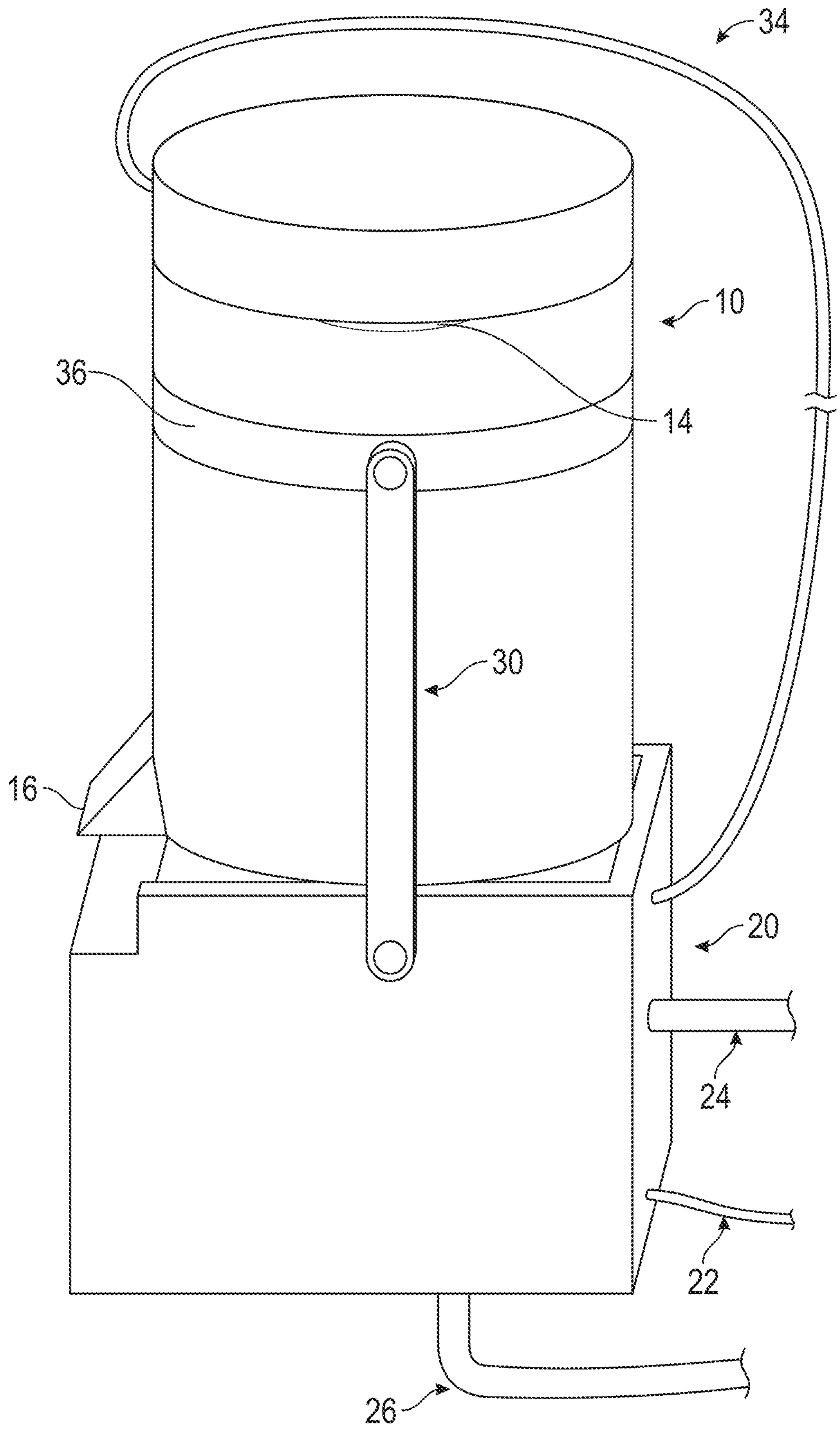
FIG. 3 illustrates a side view of the blending pitcher system in a cleaning position.

As shown in FIG. 3, the pitcher is shown in a cleaning position, such that the pitcher 10 has been rotated to lock onto the base 20. In the cleaning position, the pitcher can be upside down or inverted, such that the pitcher is oriented substantially vertically, such that the length of the pitcher 10 is substantially aligned with a vertical axis, and the closed end of the pitcher is positioned above the open end. In some examples, the pitcher 10 can be rotated between about 180° (or 180°) from the blending or upright position to achieve the pouring position. In the cleaning position, the open end of the pitcher 10 can be positioned adjacent the top surface of the base 20 and can lock onto the top surface of the base 20. In the cleaning position, any remaining foam or liquid that remains in the interior of the pitcher 10 can be drained out of the pitcher 10 towards the base 20 due to gravity. The base 20 can include a drain to receive any remaining foam or liquid. The base 20 can include a cavity 25 into which the pitcher 10 can drain, such that the cavity 25 can receive any foam or liquid from the pitcher 10.

Figure 5:
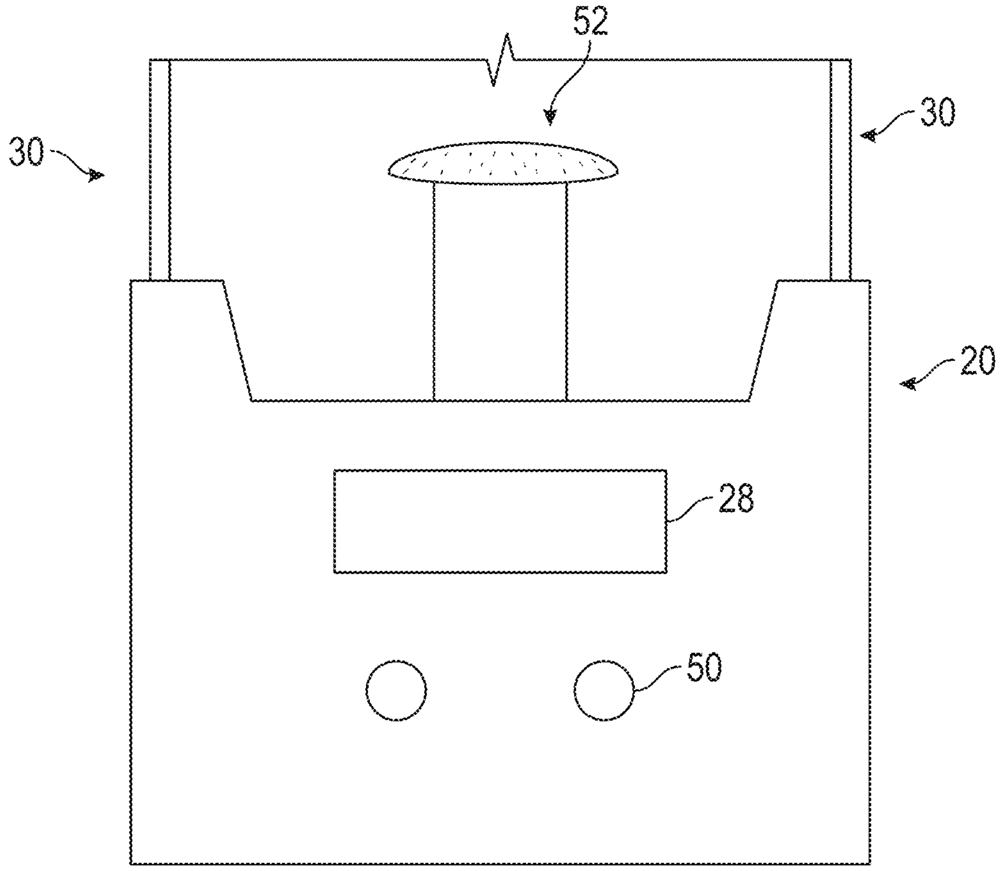
FIG. 5 illustrates a front view of a base of the blending pitcher system.

As shown in FIGS. 4-5, the base 20 can include a display 28, which can communicate information regarding the position of the pitcher or the status of the system. The base 20 can also include activation buttons 50, which can activate a blending mode or a cleaning mode of the system. The activation buttons 50 can also control rotation of the pitcher 10 in various positions, such as between the blending position, the pouring position, and the cleaning position. The activation buttons 50 can also control a rinsing feature.

The base 20 can include a rinsing feature that is configured to spray liquid, such as water and/or cleaning solution. When the open end of the pitcher 10 is locked onto the top surface of the base 20 in the cleaning position, the liquid that is sprayed from the rinsing feature is contained within the interior of the pitcher 10 and the base 20. The liquid can be sprayed into the interior surface of the pitcher 10. In some configurations, the open end of the pitcher 10 is configured to seal with the base 20 when locked onto the base 20 in the cleaning position. The seal formed can prevent liquid from leaking from between the pitcher 10 and the base 20 when liquid is sprayed from the rinsing feature into the interior of the pitcher 10.

As shown in FIG. 5, the rinsing feature can include a shower or rinsing head 52 for rinsing the pitcher 10. In some examples, the rinsing head 52 can extend from the top surface of the base 20. In some examples, the shower or rinsing head 52 can pop up. In the cleaning position, the shower head 52 of the base 20 can pop up from the base 20 towards the interior of the pitcher 10. In some configurations, the shower head 52 can be configured to pop up when activated, such as by using the one or more activation buttons 50, or can be configured to pop up when the pitcher 10 is in the cleaning position. The shower head 52 can then spray cleaning solution and/or water to clean and rinse the interior of the pitcher 10. As previously described, the base 20 can include a water inlet 24 which can receive water and/or the cleaning solution. The base 20 can also include a drain 26, which can allow the water or cleaning solution used to rinse the interior of the pitcher 10 to flow back towards the base 20 and be drained out of the base 20 through the drain 26.

Figure 6:
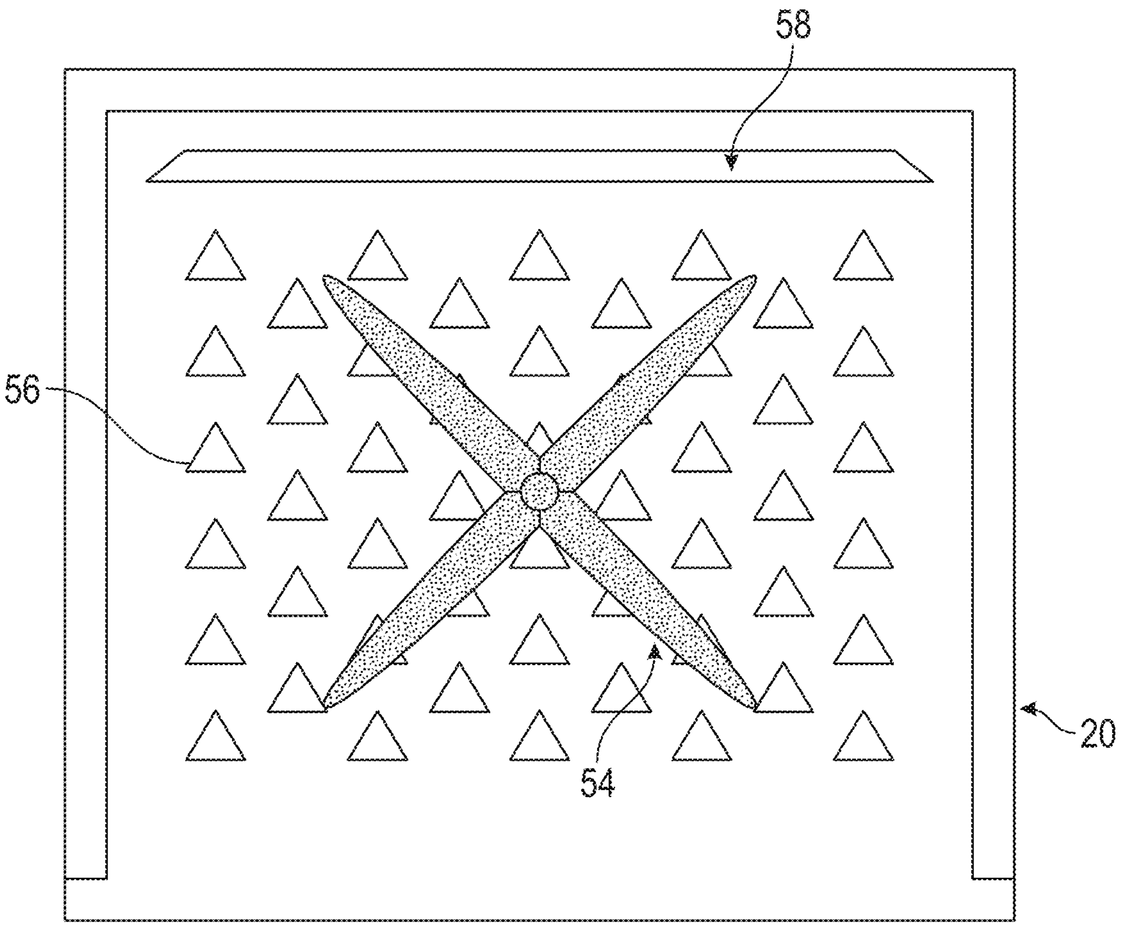
FIG. 6 illustrates a top view of the base of the blending pitcher system.

As shown in FIG. 6, the rinsing feature can include a high pressure inset spray head 54. Similarly, the high pressure spray head 54 of the base 20 can spray cleaning solution and/or water to clean and rinse the interior of the pitcher 10. The high pressure spray head 54 can be configured to spray cleaning solution and/or water at a high pressure towards the interior of the pitcher. In certain embodiments, the pressure of the spray can be between 5 psi and 90 psi. The high pressure spray head 54 can be inset in the base 20. As previously described, the base 20 can include a water inlet 24 which can receive water and/or the cleaning solution to spray into the interior of the pitcher 10. The base 20 can also include a drain 58, which can allow the water or cleaning solution used to rinse the interior of the pitcher 10 to flow back towards the base 20 and be drained out of the base 20 through the drain 58. The base 20 can also have gradient markers 56 on a top surface of the base 20. The gradient markers 56 can show the direction of the flow of water and/or cleaning solution towards the drain 58. The top surface of the base 20 can be tilted or angled to encourage the flow of water and/or cleaning solution towards the drain 58. In some examples, the top surface of the base 20 can be level.

As described, the system advantageously automatically blends and pours the foam into a beverage. Thus, the system can only require a user to add ingredients and initiate blending. The system can automatically blend the ingredients to generate foam and automatically rotate to dispense the foam into a beverage. Furthermore, the system can advantageously allow automatic cleaning without requiring removal of the pitcher and without requiring manually moving the pitcher to a secondary location. Thus, the system can automatically rotate to a cleaning position and automatically rinse the interior of the pitcher 10. The system can also automatically rotate the pitcher into an upright position into the blending position, such that the pitcher 10 is ready to receive ingredients for the next use. This advantageously allows the system to blend, pour, and be cleaned in a single location.

In some configurations, the system can blend the ingredients for a predetermined amount of time to create foam and then automatically rotate the pitcher 10 from the blending position into the dispensing position to dispense the foam into a container. In some configurations, the system can be positioned in the rotated dispensing position for a predetermined amount of time to dispense the foam into the container and then automatically rotate the pitcher 10 even further from the dispensing position into the cleaning position to clean the pitcher 10. In some configurations, the system can be positioned in the inverted or cleaning position for a predetermined amount of time while the rinsing feature sprays liquid into the interior of the pitcher to clean the pitcher and the liquid flows back to the base 20 to be drained through the drain of the base 20. In other embodiments, the system can require a user to activate each step, such as by using the one or more activation buttons 50.

In some examples, the system can rotate into the cleaning position for cleaning immediately and automatically after the pouring position. Thus, in this manner, the system can automatically blend, pour, and rinse without further user input and without requiring manual movement of any of the components of the system. In some examples, the cleaning mode can be initiated by a push of an activation button 50.

The system is an integrated blending system that allows blending, pouring and cleaning to occur all within the system. As described, the integrated system advantageously includes the blending features, such as the pitcher 10 with the blending motor 12 to actuate the blending mechanism 14 and the base 20 to stabilize the pitcher 10. The integrated system also advantageously includes the features that allow the system to automatically pour the foam, such as the pivot arms 30 to attach the base 20 and the pitcher 10 and the base motor in the base 20 to actuate rotation of the pitcher 10. The integrated system also advantageously includes the features that allow the system to automatically rinse and clean the pitcher 10, such as the pivot arms 30 to attach the base 20 and the pitcher 10 and the base motor in the base 20 to actuate rotation, the rinsing component (such as the pop up shower head 52 or the high pressure inset spray head 54), the drain in the base 20 and the water inlet 24 in the base 20.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

SUMMARY

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. An apparatus for preparing foam or blended media, the apparatus comprising:

a pitcher comprising a blending mechanism and a blending motor, the blending motor configured to actuate the blending mechanism, the pitcher configured to receive ingredients therein and the blending mechanism configured to blend the ingredients to produce the foam or the blended media;

a base comprising a rinsing feature configured to spray a liquid into an interior of the pitcher; and one or more pivot arms coupled to the pitcher and the base, the one or more pivot arms configured to actuate rotation of the pitcher, wherein the pitcher is configured to rotate into a blending position in which the pitcher is oriented substantially vertically with an open end of the pitcher positioned above a closed end of the pitcher and the closed end of the pitcher is engaged with the base, wherein the pitcher is configured to rotate into a cleaning position in which the pitcher is oriented substantially vertically with the closed end of the pitcher positioned above the open end of the pitcher and the closed end of the pitcher is disengaged from the base.

2. The apparatus of claim 1, wherein the base comprises a base motor configured to power the one or more pivot arms to actuate rotation of the pitcher.

3. The apparatus of claim 1, wherein the pitcher is configured to rotate into a pouring position, wherein in the pouring position the pitcher is rotated between about 20° to about 120° from a vertical axis.

4. The apparatus of claim 1, wherein the rinsing feature comprises a shower head that is configured to spray the liquid towards an interior of the pitcher when the pitcher is in the cleaning position.

5. The apparatus of claim 1, wherein the rinsing feature comprises a shower head configured to pop up towards the pitcher.

6. The apparatus of claim 1, wherein the rinsing feature comprises a high pressure inset spray head.

7. The apparatus of claim 1, wherein the pitcher is rotated by each of the one or more pivot arms at a rotation point, wherein the rotation point is a point where each of the one or more pivot arms attaches to the pitcher.

8. The apparatus of claim 1, wherein the one or more pivot arms comprise two pivot arms, each of the two pivot arms attached to opposing sides of the pitcher.

9. The apparatus of claim 1, wherein the base further comprises a water inlet.

10. The apparatus of claim 1, wherein the base further comprises a drain.

11. The apparatus of claim 1, wherein a top surface of the base is tilted to drain the liquid, wherein the base further comprises gradient markers on a top surface of the base to indicate a direction of a flow of the liquid.

12. The apparatus of claim 1, wherein the base further comprises one or more activation buttons to activate a blending mode or a cleaning mode.

13. The apparatus of claim 1, wherein the base further comprises one or more activation buttons to activate rotation of the pitcher.

14. The apparatus of claim 1, wherein the liquid comprises water or a cleaning solution.

15. The apparatus of claim 1, wherein the blending mechanism comprises one or more blades.

16. The apparatus of claim 1, wherein the blending mechanism comprises a whisk.

17. The apparatus of claim 1, further comprising a ring to fit around a circumference of the pitcher, wherein each of the one or more pivot arms are fastened to the ring to couple each of the one or more pivot arms to the pitcher.

* * * * *